T. BURKHARD.
Vessels for Measuring and Handling Ice-Cream, &c.

No. 165,301. Patented July 6, 1875.

UNITED STATES PATENT OFFICE.

THOMAS BURKHARD, OF NEW YORK, N. Y.

IMPROVEMENT IN VESSELS FOR MEASURING AND HANDLING ICE-CREAM, &c.

Specification forming part of Letters Patent No. 165,301, dated July 6, 1875; application filed May 17, 1875.

*To all whom it may concern:*

Be it known that I, THOMAS BURKHARD, of the city, county, and State of New York, have invented a new and useful Improvement in Vessels for Measuring, Molding, and Handling Ice-Cream, &c.; and I do hereby declare that the following is a full, clear, and exact description of the same, reference being had to the accompanying drawing, which forms part of this specification.

My invention relates to an improvement in vessels for measuring, molding, and handling ice-cream or other frozen confections, whereby I obviate the troublesome freezing of the same to the sides of the vessels or molds, or whereby, when so frozen, I am enabled to melt a very thin film of uniform thickness between every part of the walls of the mold, measure, or scoop and the contained frozen cream or ice, so as to release the said frozen confection from the mold without injury to the form imparted by the mold, or from the measure or scoop without the inconvenience of scraping with some instrument, as has been hitherto the case. My invention further enables me to readily mold in a neat and beautiful form and turn out upon a dish a small portion of ice-cream to be served to customers in a retail shop, a thing hitherto so troublesome and inconvenient that it has never been practiced to any notable extent.

Figure 1:
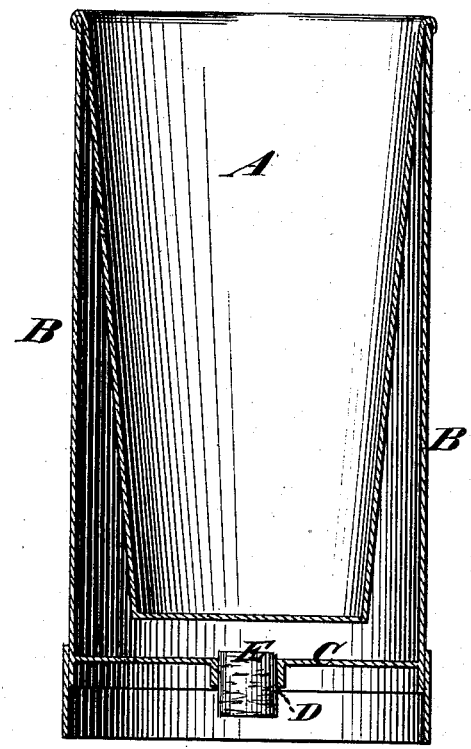
Figure 2:
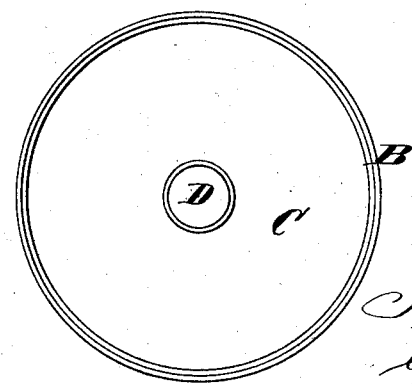

Figure 1 is a vertical central section of an improved ice-cream measure constructed according to my invention. Fig. 2 is a plan of the same.

Similar letters of reference indicate similar parts.

A is the vessel, which, in use, holds and measures the ice-cream. Its upper edge is soldered or otherwise joined in any suitable manner to an outer vessel, B. The vessel B has a bottom, C, in which is formed an opening, D. The opening is provided with a suitable stopper, E, preferably a cork. The outer wall of the vessel B projects downward below the bottom C, to form a base upon which the vessel A B can stand, without interfering with the stopper E. Legs or knobs may be substituted for the continuous downwardly-projecting outer wall.

In using this measuring-vessel I fill the space between the outer vessel B and the inner vessel A with cold water through the opening D, and then stop the opening D with the stopper E. The cold water, when the measuring-vessel is filled with frozen cream, parts with enough of its specific heat to melt a uniformly thin film between all parts of the wall of the vessel A, and thus to release the cream from the vessel, and permit the frozen confection to be turned out neatly and quickly into the vessel of the purchaser. I keep the cold water in this measuring-vessel as long as I wish without changing. It acts perfectly at any moderately low temperature above 32° Fahrenheit, quickly regaining from the surrounding air the small amount of heat it loses in melting the film which releases the cream from the vessel A.

Although in measures, scoops, and molds for serving out ice-cream to single customers in retail shops I retain for a long time the stratum of cold water between the outer and inner walls of these implements, in molds designed for sending out cream to dinner parties and the like, I first freeze cream in the said molds and pack them in refrigerating-vessels in the usual way. When desired for use the cream is released from the mold by pouring into the water-space enough cold water to fill the said space—a very quick and simple operation, which enables the molded cream to be very conveniently turned out in the most perfect manner.

I claim—

As an article of manufacture, a vessel for molding, measuring, and handling ice-cream, &c., in which is combined an outer vessel, B, provided with a bottom, C, constructed with an opening, as described, and an inner vessel, A, suspended within the outer vessel for holding the frozen cream, all substantially as and for the purpose described.

THOMAS BURKHARD.

Witnesses:
BENJAMIN W. HOFFMAN,
FRED. HAYNES.